United States Patent
Amano (10) Patent No.: US 9,143,052 B2
(45) Date of Patent: Sep. 22, 2015

(54) THREE-LEVEL UNIT INVERTER SYSTEM

(71) Applicant: FUJI ELECTRIC CO., LTD., Kawasaki (JP)

(72) Inventor: Isao Amano, Hino (JP)

(73) Assignee: FUJI ELECTRIC CO., LTD. (JP)

( * ) Notice: Subject to any disclaimer, the term of this patent is extended or adjusted under 35 U.S.C. 154(b) by 218 days.

(21) Appl. No.: 13/861,527

(22) Filed: Apr. 12, 2013

(65) Prior Publication Data

US 2013/0308357 A1    Nov. 21, 2013

(30) Foreign Application Priority Data

May 17, 2012   (JP) ................................ 2012-113512

(51) Int. Cl.
   *H02M 7/538* (2007.01)
   *H02M 7/48* (2007.01)
   *H02M 7/487* (2007.01)
   *H02M 7/49* (2007.01)
   *H02M 7/493* (2007.01)

(52) U.S. Cl.
   CPC ................ *H02M 7/48* (2013.01); *H02M 7/487* (2013.01); *H02M 7/49* (2013.01); *H02M 7/493* (2013.01)

(58) Field of Classification Search
   CPC .... H02M 7/487; H02M 1/34; H02M 3/33569
   USPC .................. 363/16–17, 37, 41, 147, 144, 98; 318/448, 459
   See application file for complete search history.

(56) References Cited

U.S. PATENT DOCUMENTS

| | | | | |
|---|---|---|---|---|
| 4,367,522 | A * | 1/1983 | Forstbauer et al. | 363/137 |
| 6,597,590 | B2 * | 7/2003 | Ikimi et al. | 363/58 |
| 7,485,987 | B2 * | 2/2009 | Mori et al. | 307/63 |
| 7,583,521 | B2 * | 9/2009 | Nielsen et al. | 363/53 |
| 7,773,400 | B2 * | 8/2010 | Nakamori et al. | 363/132 |
| 8,934,275 | B2 * | 1/2015 | Temesi et al. | 363/131 |
| 2010/0039843 | A1 * | 2/2010 | Takizawa | 363/131 |

FOREIGN PATENT DOCUMENTS

| | | |
|---|---|---|
| JP | 04-033583 A | 2/1992 |
| JP | 2006-296110 A | 10/2006 |
| JP | 2008-193779 A | 8/2008 |
| JP | 2009-142078 A | 6/2009 |

* cited by examiner

*Primary Examiner* — Rajnikant Patel
(74) *Attorney, Agent, or Firm* — Rossi, Kimms & McDowell LLP (57) ABSTRACT

In aspects of the invention, each three-level inverter unit has an output current detector. The output from each detector is given to connection wires via a resistor, the connection wires connecting the inverter units. The voltage across the resistor is detected and the deviation, or increment, of the current value of the unit concerned from the average value is determined. The rising up edge of the ON pulses for the IGBT to be controlled is delayed, corresponding to the magnitude of the deviation. Thus, the output current is balanced between the inverter units.

2 Claims, 11 Drawing Sheets

● HALF-WAVE OF POSITIVE OUTPUT VOLTAGE: Vo > 0
● PERIOD OF POSITIVE OUTPUT CURRENT: Io > 0

THREE-LEVEL UNIT INVERTER SYSTEM

BACKGROUND OF THE INVENTION

1. Field of the Invention

Embodiments of the invention relate to three-level unit inverter systems using bidirectional switches, and, in particular, to control technology for balancing output currents from inverter units.

2. Description of the Related Art

Figure 9:
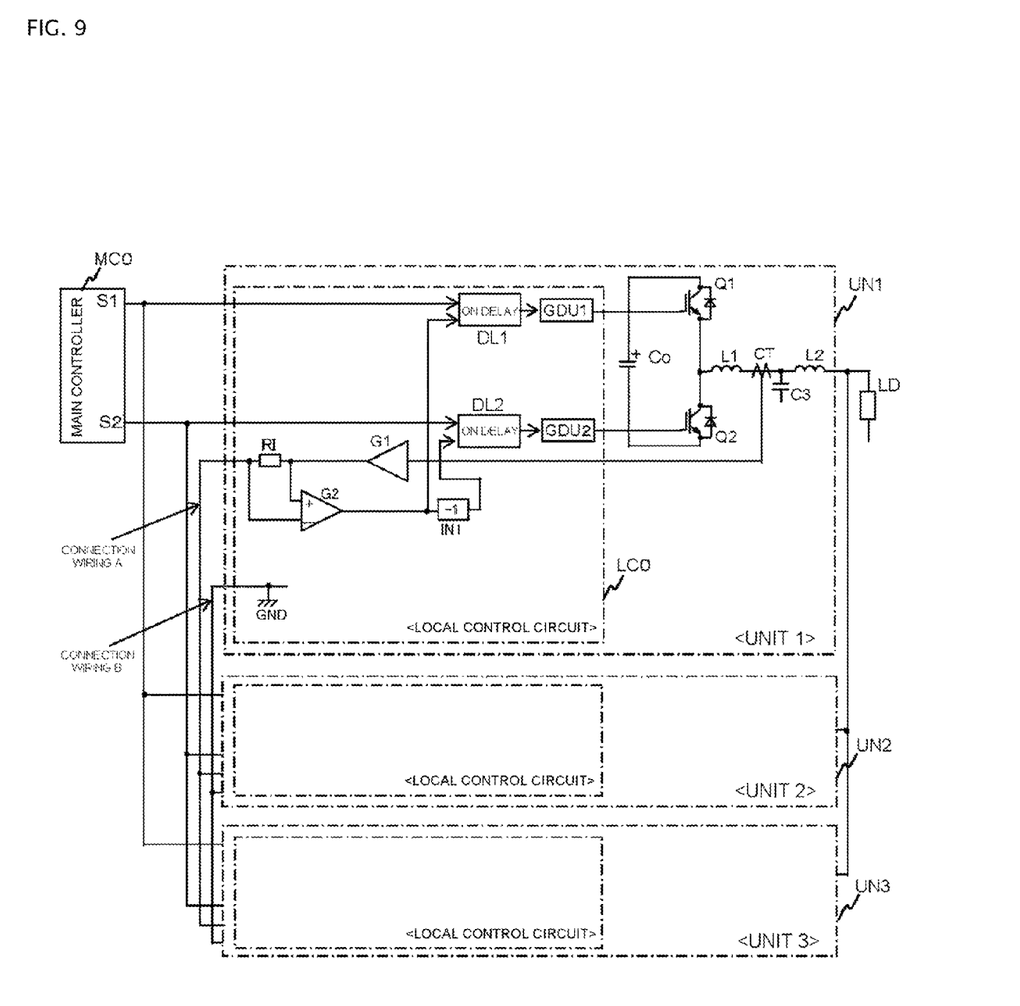
FIG. 9 is a circuit diagram of a three-level unit inverter system according to a conventional technology.

FIG. 9 is a circuit diagram of parallel-connected inverter units according to conventional technology disclosed in Japanese Unexamined Patent Application Publication No. 2006-296110 (also referred to herein as "Patent Document 1"). The circuit is composed of parallel-connected three inverter units UN1, UN2, and UN3 each employing two-level inverter circuit. The main circuit of a single-phase inverter includes four IGBTs and the main circuit of a three-phase inverter includes six IGBTs. The following description, however, is done for one phase only. Since the internal construction of each unit is similar, the description is made about the unit 1, UN1. In each inverter unit, a local control circuit LC0, receives a common ON/OFF signal from a main controller MC0 and gives ON/OFF signals to IGBTs Q1 and Q2 of the main circuit through a current balance controlling circuit and a gate driving circuit. The main circuit comprises: a capacitor C0 functioning as a DC supply, a series circuit of the IGBTs Q1 and Q2 connected in parallel with the capacitor C0, an AC filter consisting of a reactor L1 and a capacitor C3, a reactor L2 for unit parallel connection, and a current detector CT, the AC filter, the reactor L2, and the current detector CT being connected between a load LD and the series-connection point of the IGBTs Q1 and Q2.

The following describes about current balance control for the circuit of this construction. An output voltage of the current detector CT for inverter output current detection is amplified by a current amplifier G1 and the output voltage of the current amplifier G1 is connected, through a current detection resistor RI, between the inverter units via connection wires A. Connection wires B makes connection between the ground potentials GND of the local control circuits of the units. In this construction, the electric potential of the connection wire A is an average value of the output voltages of the current detectors, for equal resistance of the current detection resistors RI of the units. This averaged output voltage is proportional to the average value of output current of all units. The voltage across the resistor RI in a unit is a voltage proportional to the deviation in current of the current value in the unit concerned from the averaged current value over all units. This voltage is detected by an output current deviation detecting amplifier G2, which is a differential amplifier. The output of the differential amplifier G2 is given directly to an ON delay circuit DL1 for adjusting an ON pulse width of the IGBT Q1 and given through an inverter IN1 to an ON delay circuit DL2 for adjusting an ON pulse width of the IGBT Q2.

In this construction, in the case of a positive current deviation, or a larger output current value than the average current value, adjustment is conducted to shorten the ON pulse width of the upper arm IGBT Q1; in the case of a negative current deviation, or a smaller output current value than the average current value, adjustment is conducted to shorten the ON pulse width of the lower arm IGBT Q2. This adjustment makes the output current of the unit concerned closer to the average current value of all units. The operation described above is conducted individually with each unit to balance the output current among the units.

Figure 10:
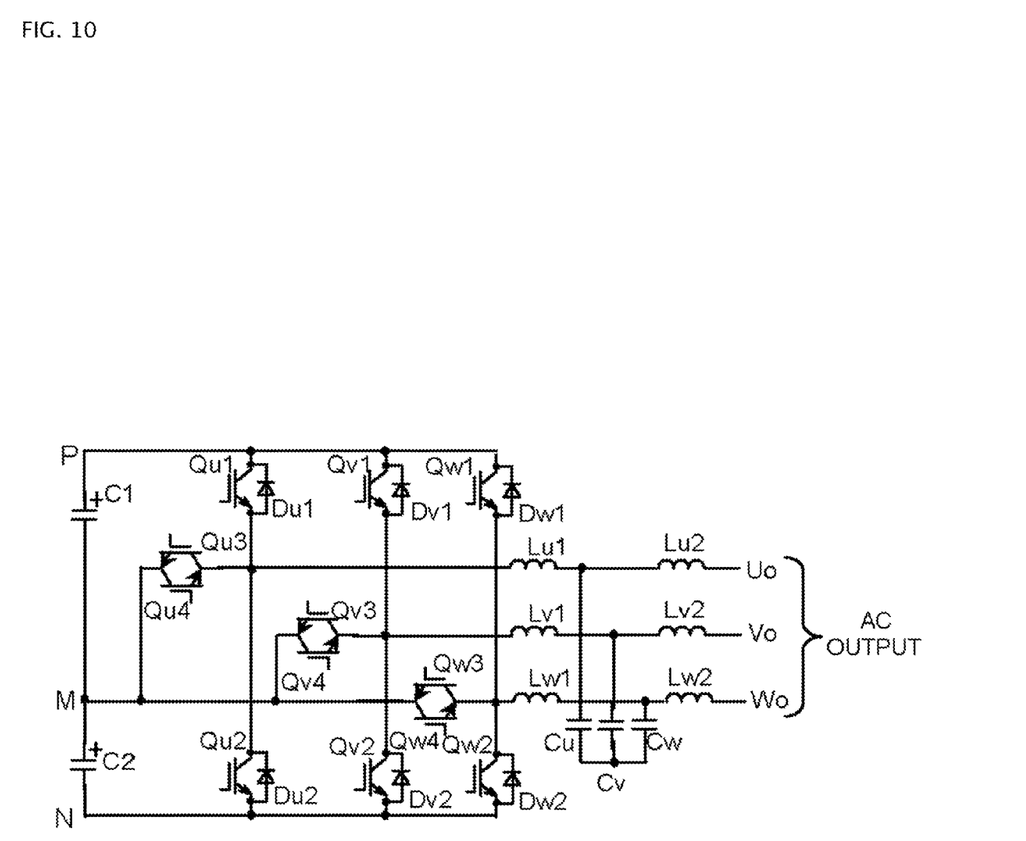
FIG. 10 is a circuit diagram of a three-level inverter, which is the object of embodiments of the invention.
Figure 11:
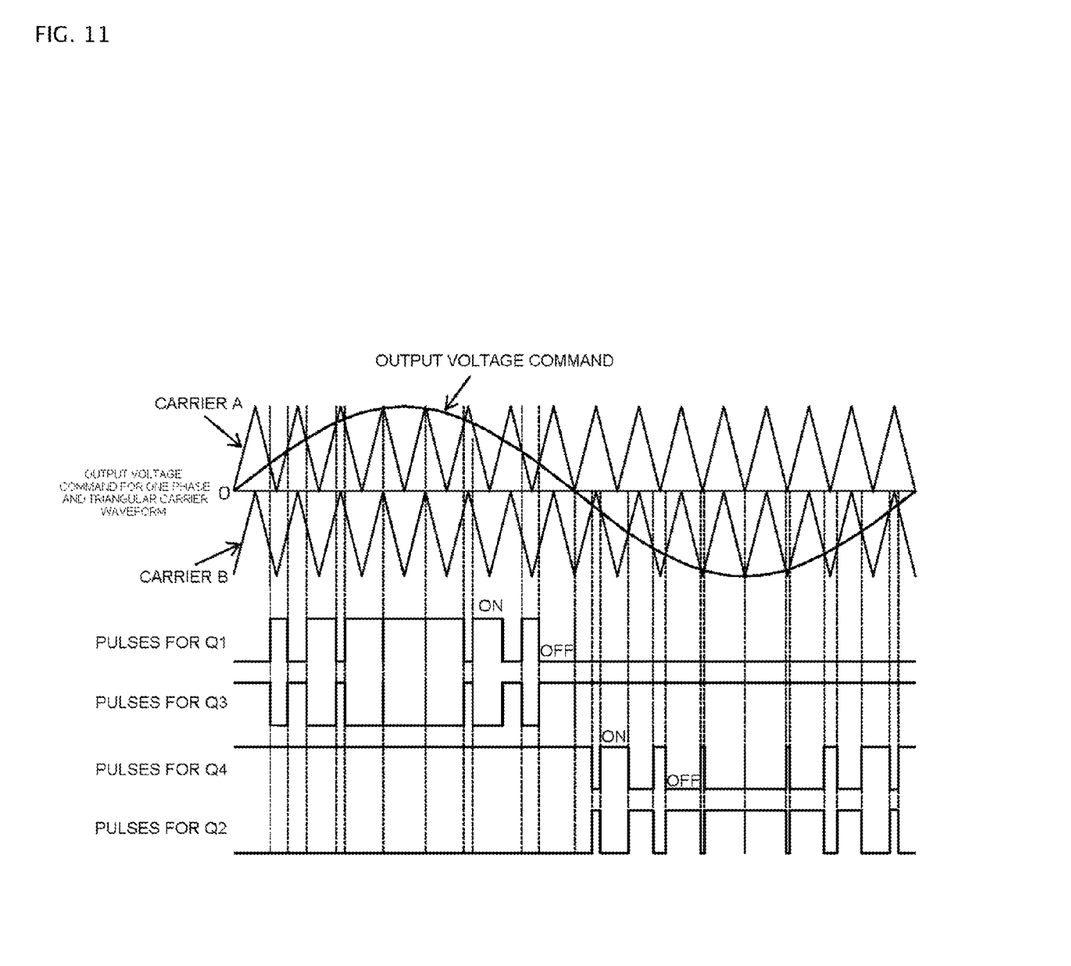
FIG. 11 illustrates operation of a three-level inverter.

FIG. 10 shows an example of circuit construction of the three-phase, three-level inverter using bidirectional switches disclosed in Japanese Unexamined Patent Application Publication No. 2008-193779 (also referred to herein as "Patent Document 2") and FIG. 11 shows an example of operation of the inverter. Referring to FIG. 10, the series circuit of capacitors C1 and C2 functions as a DC power supply having a positive terminal P, a negative terminal N, and a neutral terminal M. One phase of the circuit comprises a series circuit of an upper arm IGBT and a lower arm IGBT, and a bidirectional switch connected between the series connection point of the upper and lower arm IGBTs and the neutral terminal M of the DC power supply. The U phase circuit includes IGBTs Qu1 through Qu4 and diodes Du1 and Du2; the V phase circuit includes IGBTs Qv1 through Qv4 and diodes Dv1 and Dv2; and the W phase circuit includes IGBTs Qw1 through Qw4 and diodes Dw1 and Dw2. Bidirectional switches are constructed by the antiparallel-connection of the IGBTs Qu3 and Qu4, by the antiparallel-connection of the IGBTs Qv3 and Qv4, and by the antiparallel connection of the IGBTs Qw3 and Qw4. Between the series connection point of the IGBTs and the AC output terminal in each phase circuit, an AC filter and a reactor for parallel connection are connected. The AC filters are composed of: Lu1 and Cu for the U phase, Lv1 and Cv for the V phase, and Lw1 and Cw for the W phase. The capacitors are connected in a configuration of the star connection. The reactors for parallel connection are Lu2 for the U phase, Lv2 for the V phase, and Lw2 for the W phase.

The following describes, referring to FIG. 11, pulse patterns for one phase of the three-level inverter with the construction described above. In the one phase circuit in the following description, Q1 and Q2 designate the positive terminal P side IGBT and the negative terminal N side IGBT, respectively, of the IGBT series circuit connected between the positive terminal P and the negative terminal N of the DC power supply; and Q3 and Q4 designate the IGBT for carrying a current toward the neutral terminal of the DC power supply and the IGBT for carrying a current toward the series connection point of the IGBT series circuit, respectively, in the bidirectional switch connected between the neutral terminal of the DC power supply and the series connection point of the IGBT series circuit.

In this inverter, as shown in FIG. 11, a positive voltage is delivered by turning alternately the IGBT Q1 and the IGBT Q3 ON/OFF while holding the IGBT Q4 in the ON state. A negative voltage is delivered by turning alternately the IGBT Q2 and the IGBT Q4 ON/OFF while holding the IGBT Q3 in the ON state.

As can be seen from this operation principle, the IGBTs Q1 and Q3 operate as a half-bridge inverter to deliver a positive voltage in this three-level inverter, and the IGBTs Q2 and Q4 operate as a half-bridge inverter to deliver a negative voltage.

The IGBTs Q3 and Q4 composing the bidirectional switch in this circuit are subjected, between the emitter and collector thereof, to a high voltage, which is the voltage between the positive terminal P and the neutral terminal M or the voltage between the neutral terminal M and the negative terminal N. Accordingly, the IGBTs need to be special type of IGBTs, reverse-blocking IGBTs, exhibiting high withstand voltage between emitter and collector. This is the reason why this circuit has been practically applied only in recent years.

The output terminal delivers three levels of voltages: an electric potential at the positive terminal P of the DC power supply corresponding to turning ON of the IGBT Q1, an electric potential at the neutral terminal corresponding to turning ON of the bidirectional switch, and an electric potential at the negative terminal N corresponding to turning ON of the IGBT Q2.

A problem in the art includes the inability to ensure balance of output current between the inverter units in the unit type inverters employing a three-level inverter circuit in parallel operation.

SUMMARY OF THE INVENTION

Embodiments of the invention address this and other problems. A three-level inverter in particular comprises additionally a bidirectional switch, which is absent in conventional inverters, composed of IGBTs Q3 and Q4 connected to the neutral terminal M of the DC power supply.

A three-level unit inverter system, of a first aspect of the invention, generating an AC voltage from a DC power supply having a positive terminal, a negative terminal, and a neutral terminal comprises a plurality of inverter units employing a three-level conversion circuit, each inverter unit comprising: upper and lower arms that are series-connected IGBTs each having an antiparallel-connected diode and connected between the positive terminal and the negative terminal of the DC power supply; a bidirectional switch composed of antiparallel-connected IGBTs connected between the neutral terminal of the DC power supply and a series connection point of the upper and lower arms; AC output terminals of the inverter units being connected in parallel with each other; and the inverter units receiving pulse signals from a common main controller to the IGBTs in the inverter units; each inverter unit further comprising: a current detector for detecting AC output current from the inverter unit; an output current deviation detecting circuit for detecting a deviation of the output current of the inverter unit from an average value of the output current over all inverter units; a current deviation absolute value circuit for obtaining an absolute value of the deviation of the output current corresponding to a polarity of the output current; and ON signal delay circuits for delaying a rising up edge of the pulse signal; wherein when an absolute value of the output current of the inverter unit concerned is larger than the average value of absolute values of the output current over all inverter units and a polarity of the output current is positive, delayed are the rising up edge of the pulse signal for the IGBT of the upper arm and the rising up edge of the pulse signal for the IGBT that is one of IGBTs composing the bidirectional switch and operates exclusively with the IGBT of the lower arm, the delay being conducted corresponding to the absolute value of the deviation of the output current, and when the absolute value of the output current of the inverter unit concerned is larger than the average value of absolute values of the output current over all inverter units and a polarity of the output current is negative, delayed are the rising up edge of the pulse signal for the IGBT of the lower arm and the rising up edge of the pulse signal for the IGBT that is the other IGBT composing the bidirectional switch and operates exclusively with the IGBT of the upper arm, the delay being conducted corresponding to the absolute value of the deviation of the output current.

A three-level unit inverter system of a second aspect of the invention includes a plurality of inverter units employing a three-level conversion circuit, each inverter unit comprising: upper and lower arms that are series-connected IGBTs each having an antiparallel-connected diode and connected between the positive terminal and the negative terminal of the DC power supply; a bidirectional switch composed of antiparallel-connected IGBTs connected between the neutral terminal of the DC power supply and a series connection point of the upper and lower arms AC output terminals of the inverter units being connected in parallel with each other; and the inverter units receiving pulse signals from a common main controller to the IGBTs in the inverter units: each inverter unit further comprising: a current detector for detecting AC output current from the inverter unit; an output current deviation detecting circuit for detecting a deviation of the output current of the inverter unit from an average value of the output current over all inverter units; and ON signal delay circuits for delaying a rising up edge of the pulse signal; wherein when the output current of the inverter unit concerned is larger than the average value of the output current over all inverter units, delayed are the rising up edge of the pulse signal for the IGBT of the upper arm and the rising up edge of the pulse signal for the IGBT that is one of IGBTs composing the bidirectional switch and operates exclusively with the IGBT of the lower arm, the delay being conducted corresponding to the absolute value of the deviation of the output current; and when the output current of the inverter init concerned is smaller than the average value of the output current over all inverter units, delayed are the rising up edge of the pulse signal for the IGBT of the lower arm and the rising up edge of the pulse signal for the IGBT that is the other IGBT composing the bidirectional switch and operates exclusively with the IGBT of the upper arm, the delay being conducted corresponding to the absolute value of the deviation of the output current.

In a three-level unit inverter system in accordance with embodiments of the invention, each inverter unit comprises: a current detector, an output current deviation detecting circuit, a current deviation absolute value circuit, and ON signal delay circuits. When the absolute value of the output current of the inverter unit concerned is larger than the average value of the output current over all inverter units and a polarity of the output current is positive, delayed are the rising up edge of the pulse signal for the IGBT of the upper arm and the rising up edge of the pulse signal for the IGBT that is one of IGBTs composing the bidirectional switch and operates exclusively with the IGBT of the lower arm, the delay being conducted corresponding to the absolute value of the deviation of the output current; and when the absolute value of the output current of the inverter unit concerned is larger than the average value of the output current over all inverter units and a polarity of the output current is negative, delayed are the rising up edge of the pulse signal for the IGBT of the lower arm and the rising up edge of the pulse signal for the IGBT that is the other IGBT composing the bidirectional switch and operates exclusively with the IGBT of the upper arm, the delay being conducted corresponding to the absolute value of the deviation of the output current.

Owing to the construction of the system according to embodiments of the invention, balance of output current between units can be provided with a simple control circuit.

DETAILED DESCRIPTION in some embodiments, each of the inverter units can include a three-level unit inverter system comprises an output current detector. The output terminals of the current detectors are connected through a resistor with connection wires between the inverter units. A voltage across the resistor is detected and a deviation of the current in the unit concerned from the average output current over all the units. The rising up edge of an ON pulse for the IGBT to be controlled is delayed corresponding to the quantity of the deviation. Thus, the output current values of the inverter units are balanced.

Embodiment 1

Figure 1:
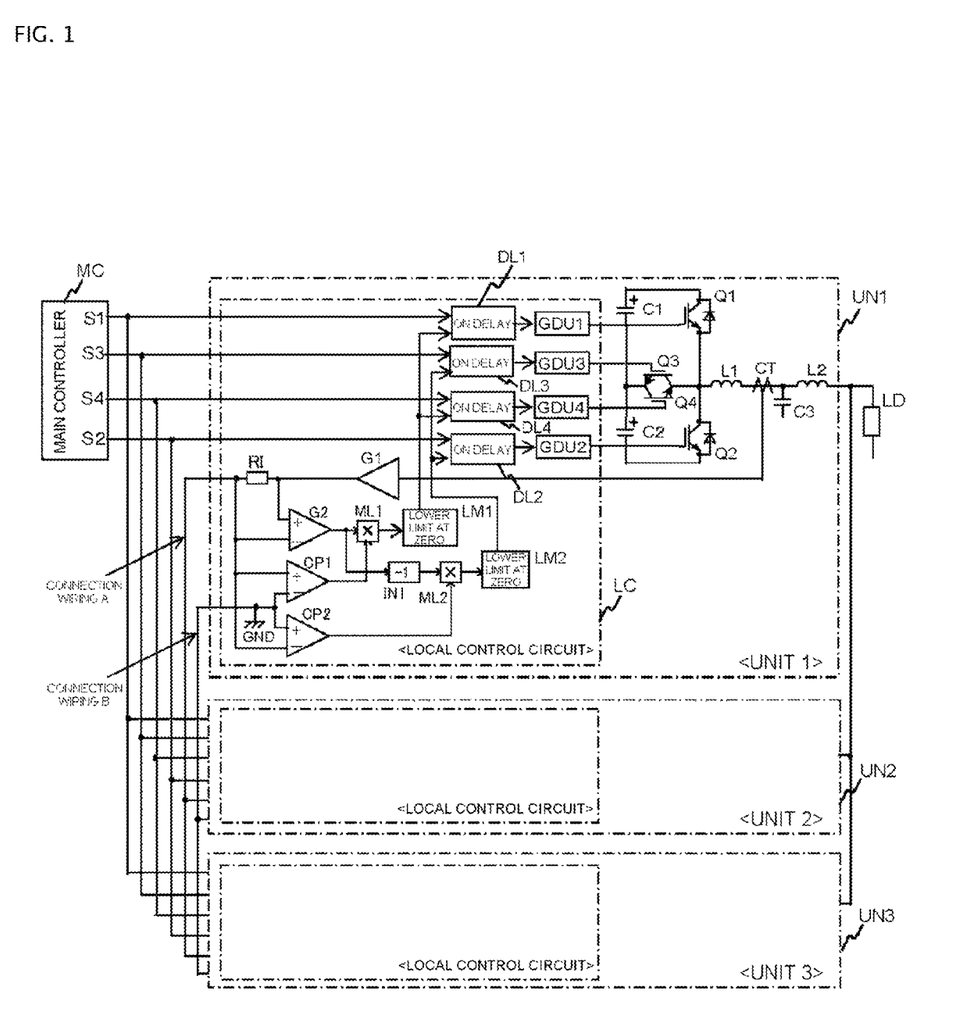
FIG. 1 is a circuit diagram of a three-level unit inverter system according to a first embodiment of the invention.

FIG. 1 shows a three-level unit inverter system according to a first embodiment of the invention. This system is composed of three inverter units, UN1, UN2, and UN3, connected in parallel employing a three-level inverter circuit having a bidirectional switch. The main circuit construction of an inverter unit shows one phase circuit of a unit inverter system. A single phase inverter is composed of two circuits of the one phase circuit and a three-phase inverter is composed of three circuits of the one phase circuit. Since every inverter unit has the same construction, description is made only about unit 1, UN1. Each inverter unit receives a common ON/OFF signal from a main controller MC, at a local control circuit, and delivers ON/OFF signals to main circuit IGBTs Q1 through Q4 via a current balance controlling circuit and a gate driving circuit. The main circuit of the inverter unit comprises: a series circuit of capacitors C1 and C2 functioning as a DC power supply, a series circuit of IGBTs Q1 and Q2 connected in parallel with the DC power supply, a bidirectional switch composed of antiparallel-connected IGBTs Q3 and Q4 and connected between the series connection point of the IGBTs Q1 and Q2 and the series connection point of the capacitors C1 and C2, an AC filter composed of a reactor L1 and a capacitor C3, a reactor L2 for unit parallel connection, and a current detector CT for detecting inverter output current; the AC filter, the reactor L2, and the current detector CT being connected between the load LD and the series connection point of the IGBTs Q1 and Q2.

The following describes about current balance control in this construction. A detected voltage from the current detector CT for detecting inverter output current is amplified by the current amplifier G1. The output voltage of the current amplifier G1 is delivered to a connection wire A through a current detecting resistor R1. The connection wires A connect the output voltages from the inverter units. Connection wires B connect ground potentials GND of local control circuits of the inverter unit. In this construction, the potential at the connection wire A is the average value of output voltages of the current detectors of the inverter units under the condition of equal resistance value of the current detecting resistors RI of all the units. This voltage is proportional to the average value of the output current values of all inverter units.

Figure 2:
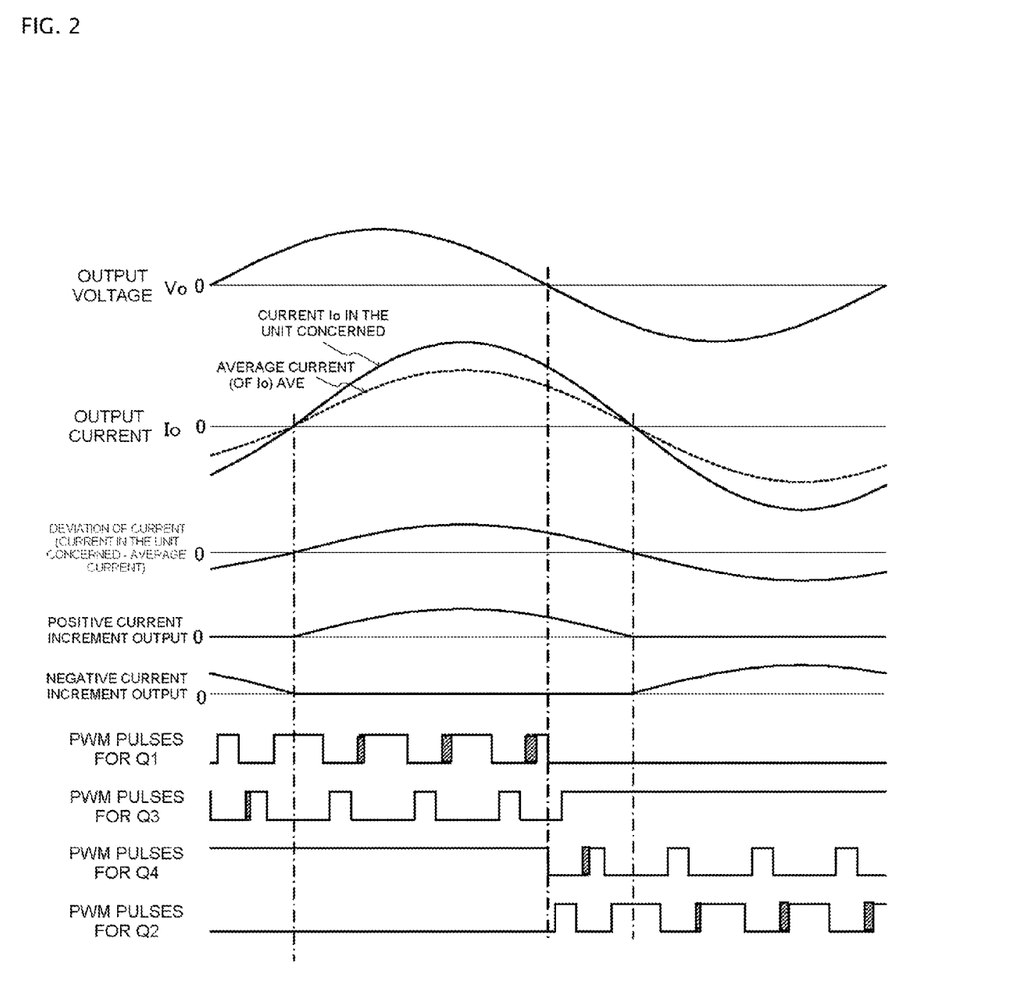
FIG. 2 shows operation waveforms illustrating operation of the circuit of the first embodiment.

FIG. 2 shows operation waveforms in current balance control. The voltage across the resistor RI in a unit is proportional to the deviation of the current in the unit concerned from the average current over all units. This voltage is detected by an output current deviation detecting amplifier G2, a differential amplifier. An increment of the current in the unit concerned from the average value AVE of current to over all units is obtained using polarity determining comparators CP1 and CP2, multipliers ML1 and ML2, and limiters LM1 and ML2 with the lower limits at zero. The increment of current is given to the ON delay circuits DL1 through DL4. When the absolute value of the current in the unit concerned in the period of a positive output current is larger than the absolute value of the average current, the output of the comparator CP1 is at a high (H) level. The multiplier ML1 delivers the increment to the limiter circuit LM1 with a lower limit of zero, which in turn transfer the signal to the ON delay circuit DL1 for the IGBT Q1 and the ON delay circuit DL4 for the IGBT Q4.

When the absolute value of the current in the unit concerned in the period of a negative output current is larger than the absolute value of the average current, the output of the comparator CP2 is at a high (H) level. The multiplier ML2 delivers the increment to the limiter circuit LM2 with a lower limit of zero, which in turn transfer the signal to the ON delay circuit DL2 for the IGBT Q2 and the ON delay circuit DL3 for the IGBT Q3. Here, the increment is delivered as a positive value in the period of a negative output current because the output of the differential amplifier G2 is inverted by the inverter IN1.

In the case the absolute value of the current in the unit concerned is smaller than the absolute value of the average current, the lower limit value zero is delivered. As a result of this control operation, the ON delay circuits DL1 through DL4 delay the rising up edge of the ON pulse for a period of time proportional to the increment of current. In the period of a positive current, the rising up edges of the ON pulses for the IGBTs Q1 and Q4 are delayed for a period of time proportional to the increment of current; and in the period of a negative current, the rising up edges of the ON pulses for the IGBTs Q2 and Q3 are delayed for a period of time proportional to the increment of current.

Figure 3:
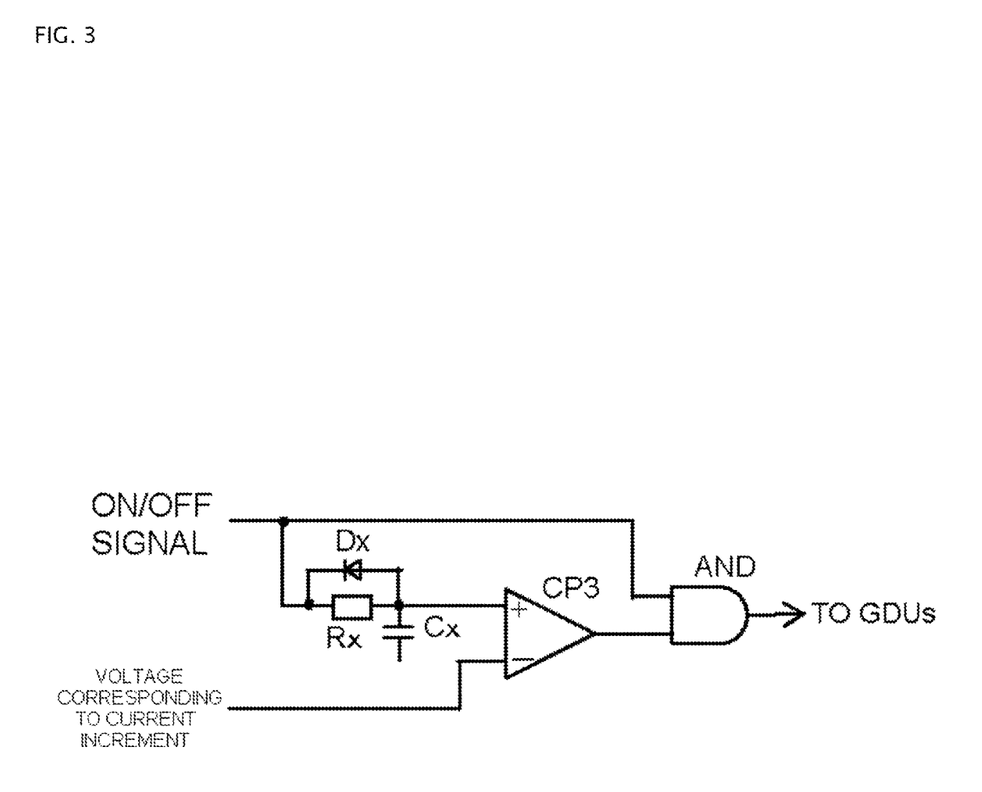
FIG. 3 shows an example of construction of an ON delay circuit.

FIG. 3 shows an example of construction of the ON delay circuit. A delay circuit composed of a resistor Rx, a capacitor Cx, and a diode Dx delays the rising up edge of the ON signal from the main controller. A comparator CP3 compares the voltage across the capacitor Cx with the voltage corresponding to the increment of current. An AND gate obtain the logical product of the output of the comparator CP3 and an ON/OFF signal. The output of the AND gate is delivered to one of gate driving circuits GDUs. Thus, the rising up edge of the ON/OFF signal is delayed by the time period corresponding to the increment of current.

In the control mode as described above, when the absolute value of the output current of the unit concerned is larger than the absolute value of the average current, the ON time of ON pulses is shortened to decrease the output current of the unit concerned. When the absolute value of the output current of the unit concerned is smaller than the absolute value of the average current, the adjustment of ON time of ON pulses is not conducted, holding the output current of the unit concerned at that value.

As a result, unbalance of output current can be corrected by adjusting the values of output current of the units to the smallest output current value.

Embodiment 2

Figure 4:
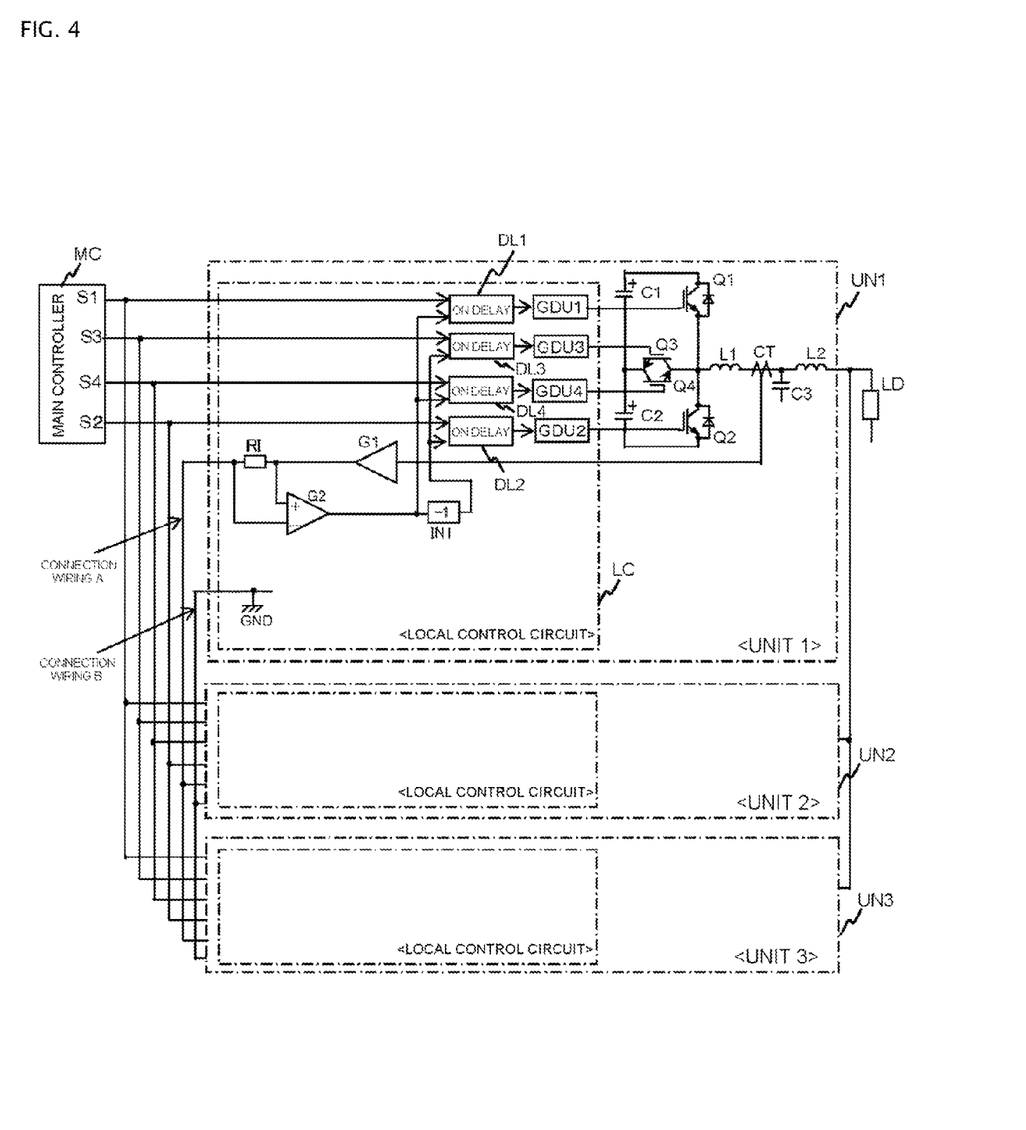
FIG. 4 is a circuit diagram of a three-level unit inverter system according to a second embodiment of the invention.

FIG. 4 is a circuit diagram of a three-level unit inverter system according to a second embodiment of the invention.

The overall system construction and the main circuit construction are similar to those in Embodiment 1. Embodiment 2 is a different version of the system in which the local control circuit in Embodiment 1 is simplified in certain respects. Removed from the current balance control circuit of Embodiment 1 are: comparators CP1 and CP2, the multipliers ML1 and ML2, and the limiters LM1 and LM2 with a lower limit of zero.

The following describes about current balance control in this construction. A detected voltage from the current detector CT for detecting inverter output current is amplified by the current amplifier G1. The output voltage of the current amplifier G1 is delivered to a connection wire A through a current detecting resistor R1. The connection wires A connect the output voltages from the inverter units. Connection wires B connect ground potentials GND of local control circuits of the inverter units. In this construction, the potential at the connection wire A is the average value of output voltages of the current detectors of the inverter units under the condition of equal resistance values of the current detecting resistors R1 of all the units. This voltage is proportional to the average value of the output current values of all inverter units.

Figure 5:
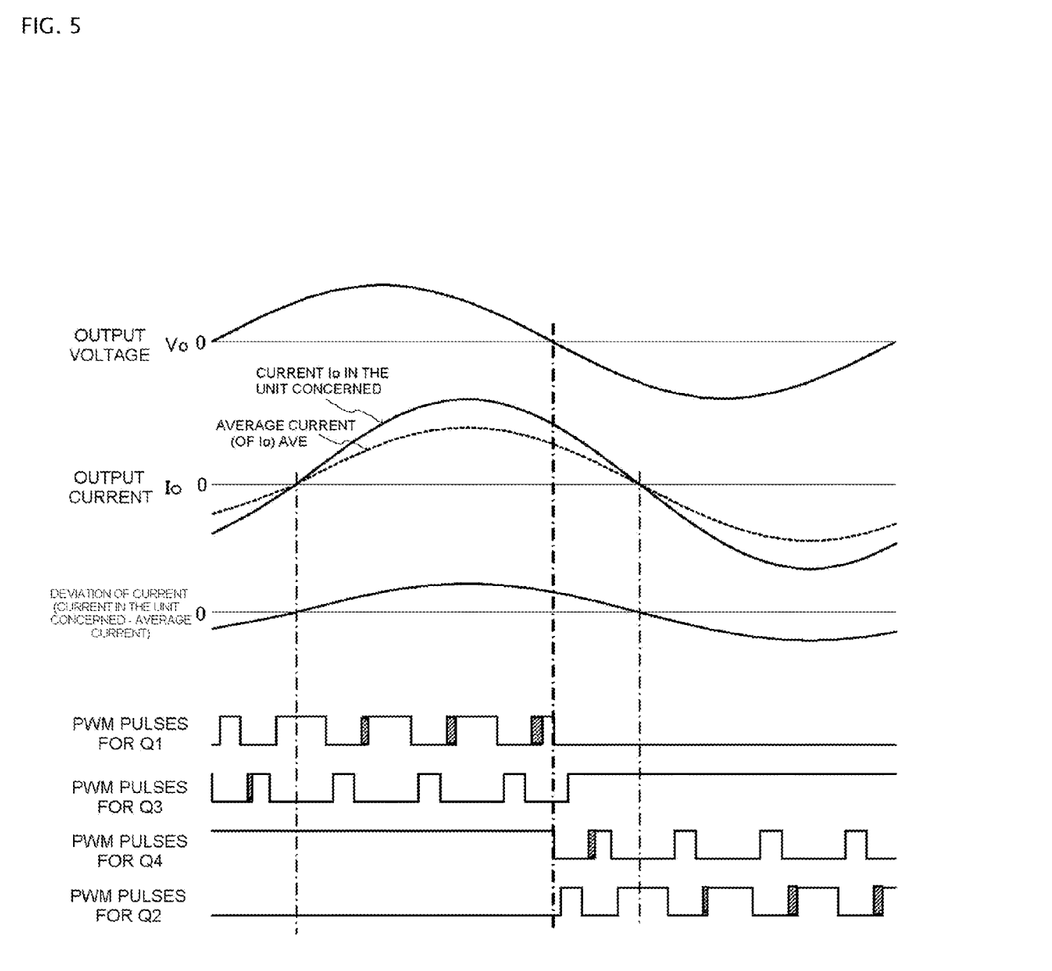
FIG. 5 shows an operation waveforms illustrating operation of the circuit of the second embodiment.

FIG. 5 shows operation waveforms in current balance control. The voltage across the resistor RI in a unit is proportional to the deviation of the current in the unit concerned from the average current over all units. This voltage is detected by an output current deviation detecting amplifier G2, a differential amplifier. Different from Embodiment 1, the current deviation detecting circuit of the local control circuit in Embodiment 2 does not include a mechanism for obtaining an absolute value and detects a difference in the current, irrespective of the polarity. Unbalance in current is corrected in Embodiment 2 by delaying the rising up edge of the ON signal from the main controller MC based on the deviation of the output current detected by the differential amplifier G2 for detecting deviation of current.

Operation of current balance control is performed as follows. The deviation of output current is given to the ON delay circuits DL1 and DL4 for delaying rising up edges of the ON pulses for the IGBT Q1 and the IGBT Q4 to delay the rising up edges of the ON pulses for the IGBTs Q1 and Q4 in proportion to the magnitude of the deviation of the output current. The output of the differential amplifier G2, the output current deviation, is inverted the polarity thereof by the inverter IN1 and the inverted value is then given to the ON delay circuits DL2 and DL3 for delaying the rising up edges of the ON pulses for the IGBTs Q2 and Q3 Thus, the rising up edges of the ON pulses for the IGBTs Q2 and Q3 are delayed in proportion to the output current deviation.

The following describes effects of the control mode described above. In Embodiment 2 similarly to Embodiment 1, when the absolute value of the output current of the unit concerned is larger than the absolute value of the average value over all units, the ON pulse width is shortened by delaying the rising up edge of the ON pulse to decrease the current. In the operation of Embodiment 2, PWM pulse width is adjusted also when the absolute value of the output current of the unit concerned is smaller than the average value of the output current over all units. This adjustment, however, does not affect change of the output current. Consequently, the operation in Embodiment 2 results in the same correction effect on the output current as the one in Embodiment 1; the correction effect of adjustment to decrease the output current is obtained only in the case the absolute value of the output current of an unit is larger than the average value of the output current over all units.

Figure 6A:
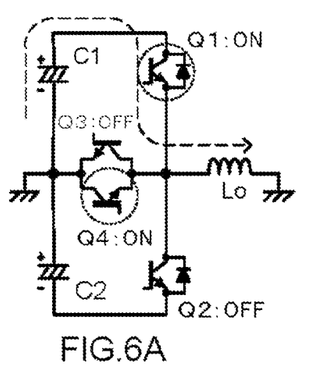
FIGS. 6A, 6B, and 6C are circuit diagrams for illustrating an effect of embodiments of the invention.
Figure 6B:
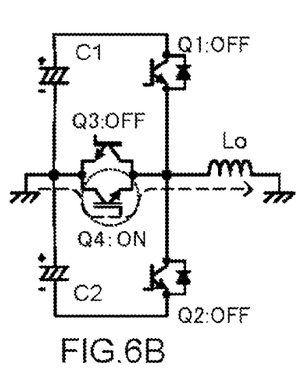
Figure 6C:
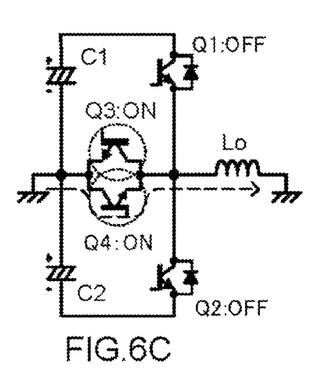

The reason for this is described in the following referring to FIGS. 6 through 8. FIGS. 6A, 6B and 6C show ON/OFF state of the IGBTs Q1 through Q4 and the current path in the case of positive output voltage and in the period of positive output current. FIG. 8A shows a current path during the IGBT Q1 is ON, in which the current flows from the positive terminal P of the DC power supply to the output reactor Lo. FIG. 6B shows a current path during the IGBT Q1 is OFF and the IGBT Q4 is ON, in which the current flows from the neutral terminal M of the DC power supply to the output reactor Lo. FIG. 6C shows a current path during the IGBTs Q3 and Q4 are ON, in which the current flows through the IGBT Q4 irrespective of the ON/OFF state of the IGBT Q3.

Figure 7:
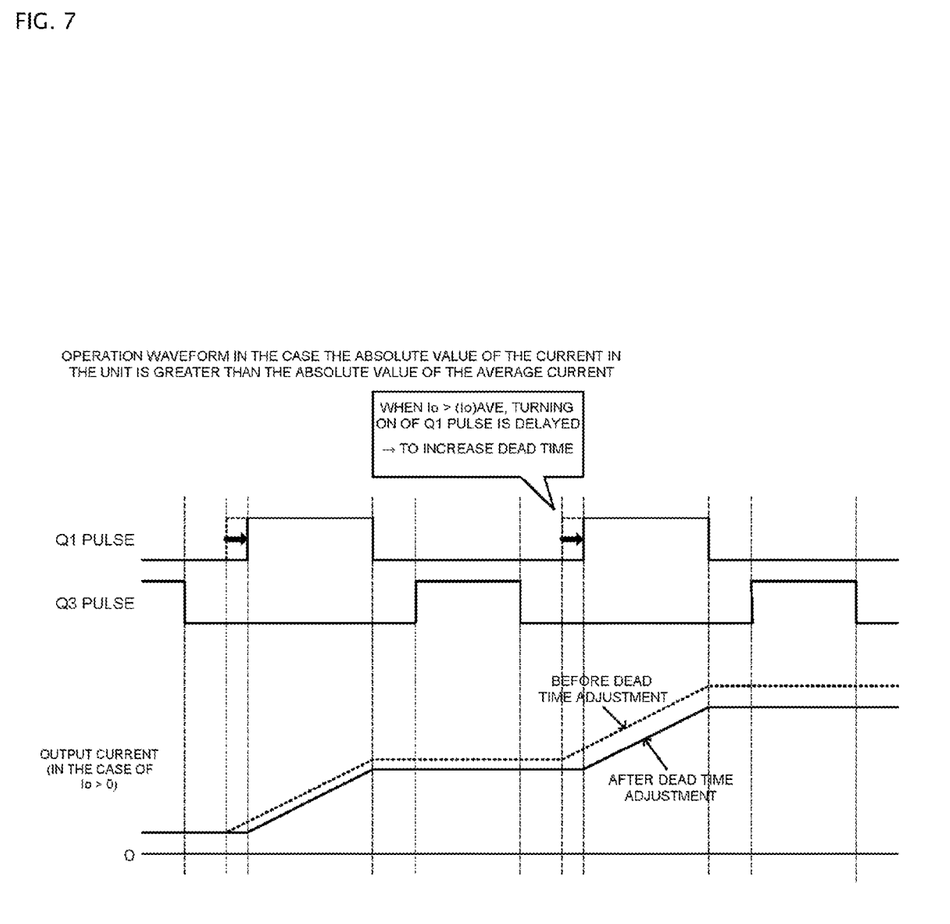
FIG. 7 is operation chart A illustrating an effect of embodiments of the invention.
Figure 8:
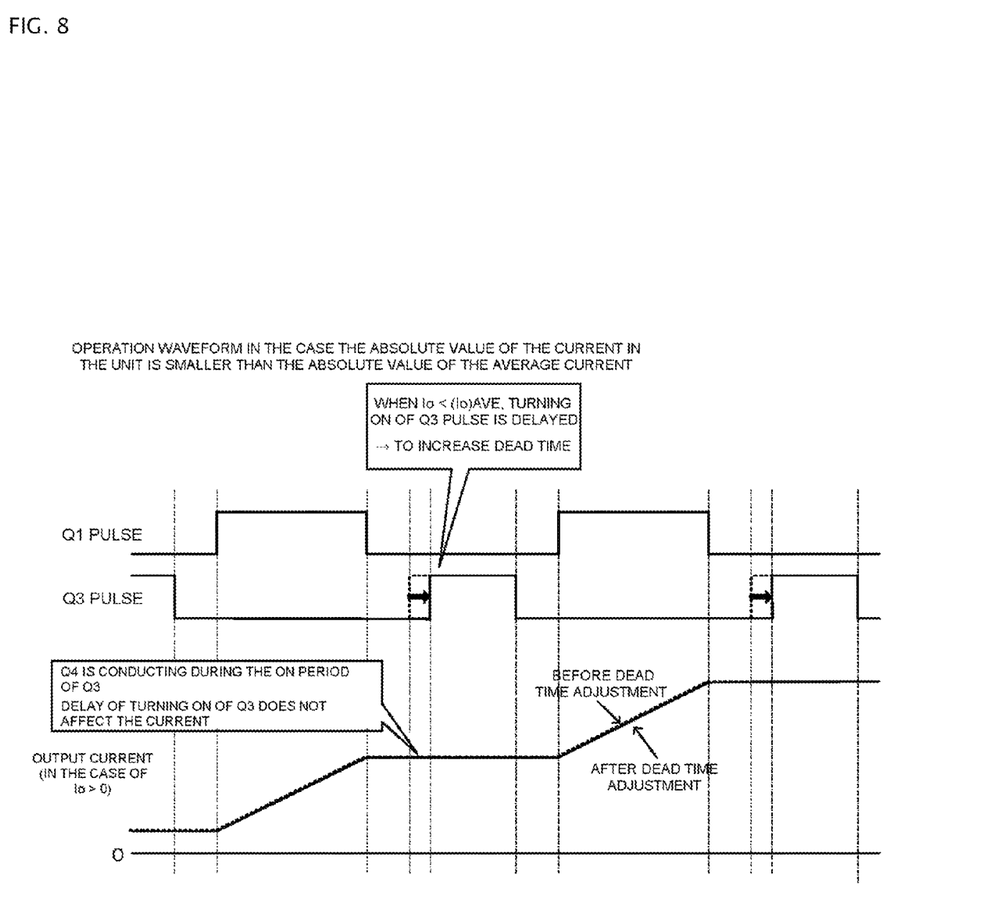
FIG. 8 is operation chart B illustrating an effect of embodiments of the invention.

FIGS. 7 and 8 show operation waveforms in the case of positive output voltage (Vo>0) and the positive output current (Io>0). FIG. 7 illustrates operation waveforms in the case the absolute value of the output current of the unit concerned is larger than the absolute value of the average current over all units. When the output current of the unit concerned is larger than the average current, the rising edges of ON pulses of the IGBTs Q1 and Q4 are delayed. However, in the case Vo>0, the IGBT Q4 is held in the ON state and no rising up edge exists; thus, solely the rising up edges of ON pulses of the IGBT Q1 are delayed. Since the ON time of the IGBT Q1 is shortened by delaying the rising up edge of ON pulses, the output current of the unit decreases.

FIG. 8 illustrates operation waveforms in the case the absolute value of the output current of the unit concerned is smaller than the absolute value of the average current over all units. When the output current of the unit concerned is smaller than the average current, the rising edges of ON pulses of the IGBTs Q2 and Q3 are delayed. However, in the case Vo>0, the IGBT Q2 is held in the OFF state and no rising up edge exists; thus, solely the rising up edges of ON pulses of the IGBT Q3 are actually delayed. In the case of Io>0, the IGBT Q3 carries no current, but the IGBT Q4 antiparallel connected to the IGBT Q3 carries the current. Thus, the output current is not affected by shortening the ON time of the IGBT Q3.

As described above, the Embodiment 2, which lacks a circuit to detect an absolute value of the current, functions to decrease the current in the unit with a large absolute value of output current just as the Embodiment 1, achieving correction of unbalance of output current between units. Therefore, the Embodiment 2 can obtain a similar effect by a simpler circuit, in some respects, than that of Embodiment 1.

Although the bidirectional switch in the embodiments described thus far is composed of antiparallel connected IGBTs, the bidirectional switch in the present invention can be composed of a combination of an IGBT and a diode. Although the increment of current is decreased by shortening the ON pulse width in the embodiments described above, the increment of current can be reduced by elongating time duration or increasing rate of the OFF pulse, or by increasing the current in the unit that is carrying less current.

Embodiments of the invention are directed to a technology for constructing a large capacity converter comprising parallel connected units, and can be applied to uninterruptible power supplies, instantaneous voltage drop compensators, and the like system.

Examples of specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the above description, specific details are set forth in order to provide a thorough understanding of embodiments of the invention. Embodiments of the invention may be practiced without some or all of these specific details. Further, portions of different embodiments and/or drawings can be combined, as would be understood by one of skill in the art.

This application is based on, and claims priority to, Japanese Patent Application No. 2012-113512, filed on May 17, 2012, contents of which are incorporated herein by reference.

What is claimed is:

1. A three-level unit inverter system for generating AC voltage from a DC power supply having a positive terminal, a negative terminal, and a neutral terminal, the unit inverter system comprising a plurality of inverter units employing a three-level conversion circuit, each inverter unit comprising:
   upper and lower arms that include series-connected IGBTs each having an antiparallel-connected diode and connected between the positive terminal and the negative terminal of the DC power supply;
   a bidirectional switch composed of antiparallel-connected IGBTs connected between the neutral terminal of the DC power supply and a series connection point of the upper and lower arms;
   AC output terminals of the inverter units being connected in parallel with each other; and
   the inverter units receiving pulse signals from a common main controller to the IGBTs in the inverter units;
each inverter unit further comprising:
   a current detector for detecting AC output current from the inverter unit;
   an output current deviation detecting circuit for detecting a deviation of the output current of the inverter unit from an average value of the output current over all inverter units;
   a current deviation absolute value circuit for obtaining an absolute value of the deviation of the output current corresponding to a polarity of the output current; and
   ON signal delay circuits for delaying a rising up edge of the pulse signal;
wherein
   when an absolute value of the output current of the inverter unit concerned is larger than the average value of absolute values of the output current over all inverter units and a polarity of the output current is positive, delayed are the rising up edge of the pulse signal for the IGBT of the upper arm and the rising up edge of the pulse signal for the IGBT that is one of IGBTs composing the bidirectional switch and operates exclusively with the IGBT of the lower arm, the delay being conducted corresponding to the absolute value of the deviation of the output current; and
   when the absolute value of the output current of the inverter unit concerned is larger than an absolute value of the average value of the output current over all inverter units and a polarity of the output current is negative, delayed are the rising up edge of the pulse signal for the IGBT of the lower arm and the rising up edge of the pulse signal for the IGBT that is the other IGBT composing the bidirectional switch and operates exclusively with the IGBT of the upper arm, the delay being conducted corresponding to the absolute value of the deviation of the output current.

2. A three-level unit inverter system for generating AC voltage from a DC power supply having a positive terminal, a negative terminal, and a neutral terminal, the unit inverter system comprising a plurality of inverter units employing a three-level conversion circuit, each inverter unit comprising:
   upper and lower arms that include series-connected IGBTs each having an antiparallel-connected diode and connected between the positive terminal and the negative terminal of the DC power supply;
   a bidirectional switch composed of antiparallel-connected IGBTs connected between the neutral terminal of the DC power supply and a series connection point of the upper and lower arms;
   AC output terminals of the inverter units being connected in parallel with each other; and
   the inverter units receiving pulse signals from a common main controller to the IGBTs in the inverter units;
each inverter unit further comprising:
   a current detector for detecting AC output current from the inverter unit;
   an output current deviation detecting circuit for detecting a deviation of the output current of the inverter unit from an average value of the output current over all inverter units; and
   ON signal delay circuits for delaying a rising up edge of the pulse signal;
wherein
   when the output current of the inverter unit concerned is larger than the average value of the output current over all inverter units, delayed are the rising up edge of the pulse signal for the IGBT of the upper arm and the rising up edge of the pulse signal for the IGBT that is one of IGBTs composing the bidirectional switch and operates exclusively with the IGBT of the lower arm, the delay being conducted corresponding to the absolute value of the deviation of the output current; and
   when the output current of the inverter unit concerned is smaller than the average value of the output current over all inverter units, delayed are the rising up edge of the pulse signal for the IGBT of the lower arm and the rising up edge of the pulse signal for the IGBT that is the other IGBT composing the bidirectional switch and operates exclusively with the IGBT of the upper arm, the delay being conducted corresponding to the absolute value of the deviation of the output current.

* * * * *